United States Patent
Maldonado Pardo

(10) Patent No.: US 12,057,684 B2
(45) Date of Patent: Aug. 6, 2024

(54) VARIABLE RADIO FREQUENCY ELECTROMAGNETIC COMPENSATING DEVICE FOR PROTECTING WIND TOWER BLADES OR OTHER MOBILE OR STATIC STRUCTURES

(71) Applicant: DINNTECO FACTORY GASTEIZ, S.L., Vitoria Gasteiz (ES)

(72) Inventor: Antonio Javier Maldonado Pardo, Vitoria Gasteiz (ES)

(73) Assignee: DINNTECO FACTORY GASTEIZ, S.L., Vitoria Gasteiz (ES)

( * ) Notice: Subject to any disclaimer, the term of this patent is extended or adjusted under 35 U.S.C. 154(b) by 338 days.

(21) Appl. No.: 17/624,421

(22) PCT Filed: Jun. 3, 2020

(86) PCT No.: PCT/ES2020/070372
§ 371 (c)(1),
(2) Date: Jan. 3, 2022

(87) PCT Pub. No.: WO2020/249840
PCT Pub. Date: Dec. 17, 2020

(65) Prior Publication Data
US 2023/0083726 A1      Mar. 16, 2023

(30) Foreign Application Priority Data
Jun. 14, 2019   (ES) .............................. ES201930547

(51) Int. Cl.
*H02G 13/00*      (2006.01)
*B64D 45/02*      (2006.01)
(Continued)

(52) U.S. Cl.
CPC ............. *H02G 13/80* (2013.01); *B64D 45/02* (2013.01); *F03D 80/30* (2016.05); *H01Q 1/50* (2013.01); *H02H 9/04* (2013.01)

(58) Field of Classification Search
CPC ........ H02G 13/00; H02G 13/80; F03D 17/00; F03D 80/30; B64D 45/02; H02H 9/04; Y02E 10/72
(Continued)

(56) References Cited

U.S. PATENT DOCUMENTS

| 5,532,897 A | 7/1996 | Carpenter, Jr. |
| 2016/0164197 A1* | 6/2016 | Harwath ................. H04B 5/22 439/578 |
| 2017/0328350 A1* | 11/2017 | Bendlak ................. F03D 3/062 |

FOREIGN PATENT DOCUMENTS

| CN | 201378679 Y | 1/2010 |
| CN | 202210678 U | 5/2012 |

(Continued)

OTHER PUBLICATIONS

Int'l Search Report for PCT/ES2020/070372, dated Sep. 3, 2020.

*Primary Examiner* — Danny Nguyen
(74) *Attorney, Agent, or Firm* — MaxGoLaw PLLC

(57) ABSTRACT

A variable frequency electromagnetic compensating device for protecting wind tower blades or other mobile or static structures includes two conductive adapters of connection (1, 2) charged, one (1) of the connections of the device with the external collectors of the element to be protected on the one hand and another (2) of the connections with the earth, on the other hand; and two elements of high reactance to the passage of high frequency current and absorbers of energy in form of heat (3, 4) connected on both sides of a frequency resonator composed of a dielectric insulator (9) located between a first and a second conductive elements (7, 8) and respectively to the two adapters (1, 2), generating a force (Continued)

against electromotive to the passage of initial high frequency current, lowering the frequency and absorbing a part of the energy generated in heat.

10 Claims, 1 Drawing Sheet

(51) Int. Cl.
    *F03D 80/30*     (2016.01)
    *H01Q 1/50*     (2006.01)
    *H02H 9/04*     (2006.01)

(58) Field of Classification Search
    USPC .......................................... 361/212, 218, 220
    See application file for complete search history.

(56) References Cited

FOREIGN PATENT DOCUMENTS

| | | | |
|---|---|---|---|
| CN | 103296669 | A | 9/2013 |
| EP | 3404792 | A1 | 11/2018 |

\* cited by examiner

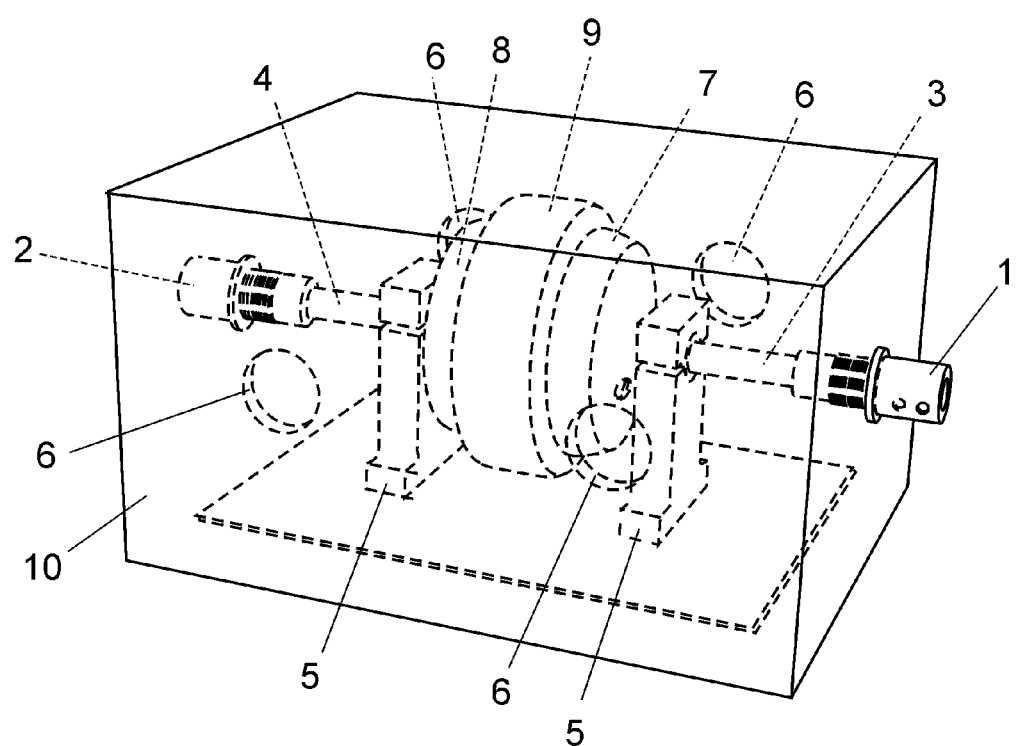

VARIABLE RADIO FREQUENCY ELECTROMAGNETIC COMPENSATING DEVICE FOR PROTECTING WIND TOWER BLADES OR OTHER MOBILE OR STATIC STRUCTURES

OBJECT OF THE INVENTION

The invention, as stated in the title of this specification, refers to a variable radio frequency electromagnetic compensating device for protecting the wind tower blades or other mobile or static structures that provides the function to which it is designed with advantages and characteristics, that are disclosed in detail thereafter.

The object of this invention refers to a device which aim is to provide a means for protecting the wind tower blades and mobile or static structures that are provided with metal elements for collecting electric charges on their surface, against the direct atmospheric discharges, as well as against electromagnetic pulses that could affect them coming from atmospheric discharges between clouds, either positive or negative, in its close environment and against those coming from towers or radiant antenna emissions, from telecommunications, radars of any type or from another origin.

FIELD OF APPLICATION OF THE INVENTION

The field of application of this invention is within the sector of the industry engaged in manufacturing apparatuses, systems and devices for protecting metal structures against the collection of electric charges.

BACKGROUND OF THE INVENTION

As reference to the current state-of-the-art, in must be quoted that, at least the applicant is not aware of the existence of any other electromagnetic compensating device, or of any other invention to be applied for protecting wind tower blades or other mobile or static structures, having metal elements for collecting electric charges or for any other similar application, possessing technical and structural characteristics same or like those that the one herein claimed possesses.

EXPLANATION OF THE INVENTION

The variable radio frequency electromagnetic compensating device for protecting wind tower blades or other mobile or static structures that the invention proposes, as it was said before, has as object protecting the wind tower blades and mobile or static structures that are provided with metal elements for collecting electric charges on their surface, against the direct atmospheric discharges, as well as against the electromagnetic pulses that can affect it, coming from atmospheric discharges between clouds, either positive or negative, in its close environment and against those coming from towers or radiant antenna emissions, from telecommunications, radars of any type or of another origin.

The device object of the patent can be placed inside or outside the structure to be protected, depending on each case, although preferably it is arranged inside and, anyway, interconnected between the external collecting elements of the structure to be protected and the connection to the earth. For the case of protecting a wind tower blade, the device is placed inside the blade and is interconnected between the mobile or static collecting elements (depending on whether the blade is moving or not) of the blade and its connection to the earth.

The protecting device is activated in the moment that a sufficient accumulation of electrostatic charge appears, either of atmospheric origin due to the appearance of an electric field in its immediate environment or by electrification due to the constant movement of the electric charges collecting elements, such as for example, the constant movement of the wind tower blades or the movement of a crane or of a mobile telescope, and variable radio frequency electromagnetic pulses, of atmospheric origin or coming from external sources such as radiant towers or from telecommunications, radars, etc., carrying out first a high reactance effect (force against electromotive) to the passage of high frequency current converting it into heat and leaving passage to the low current, in order to eventually carry out a compensation of the charges existing between the connection to the external mobile or static collecting elements (for example, the blades) and the earth connection. The compensating effect is activated at a given value of difference of potential existing inside the device and compensates all the charges over this potential value, preventing that ascendant markers are formed in the mobile or static external collecting elements.

The variable radio frequency electromagnetic compensating device, object of this invention, is the result of the knowledge of the frequency spectrums existing in the atmospheric phenomena and in the electromagnetic pulses generated in them and those derived from external sources, such as the radiant towers, telecommunications, radars and AM, FM signals as well as investigations related to the analysis of resonant modes of variable radio frequency in different structures.

The design of the device object of the invention was also based in studies on the results of the radio frequency electromagnetic field obtained by simulation for distributions of the electric field E, magnetic field H and density of superficial current J in different moments of time comparable to each other in frequency spectrums ranging from 0.4 GHz to 1.9 GHZ, where potential designs of resonant structures of electromagnetic fields are concluded that have a main resonant mode in a given frequency in GHz and an almost continue of oblique modes in the rest of the spectrum of frequency, achieving results of designs of the device object of the invention, that is acting like a resonator of electromagnetic radio frequencies that facilitates the electric discharges, mainly in the spectrum of frequencies (0.4 to 1.9 GHZ). These electric discharges take place due to the absorption of the variable radio frequency electromagnetic fields and the recombination of the electric charges having a different sign (mostly positive electrons and ions). This occurs due to the participative action of the static electrical and magnetic fields, as well as of the resonant electromagnetic field in different frequencies. Both actions facilitate the combination of charges as they remain involved (temporarily trapped) in close confinement zones by the effect of the radio frequency electromagnetic field, where due to the action of mobility promoted by the static fields the compensation of the electric charge is stimulated.

Therefore, the device of the invention has as operating principle, on one hand, acting with high reactance to the passage of high frequency currents transforming it in heat, leaving that only the low frequency currents pass and on the other hand, the compensation of the variable radio frequency electromagnetic fields, acting as a constant sink, from a given difference of potential (ranging from 10 to 20 KV), of the variable radio frequency electric charges.

These processes take place in the confinement of the device, that is a airtight and antifire box, but its permanent and almost continuous activity is felt in a far-reaching environment, concretely in all the conductive structures connected in both terminals of the device, either direct or by electric continuity, because the compensating processes of homogenization, conductivity between materials and thermalization stimulate the diffusion between conductive means in unbalance local environments.

Based on the studies, and bearing in mind that the device possesses a limit in its capacity of electromagnetic compensation, that basically depends on the speed of transmission of the charges accumulated in the mobile or statistic collectors of the structure to be protected (for example the wind tower blade) towards the device, as well as on the value of the earth resistor to which the device is connected (it shall have to be always lower than 10 Ohms in order there is as good transmission of electric charges towards the device) and of the frequency spectrum of the current transmitted, by installing the device, a variable absorption of low intensity current toward the earth is achieved, avoiding that the mobile or statistic external collecting systems of the structure to be protected in which it is incorporated, generate ascendant markers (derived from its own movement or of possible variations of electrical fields of atmospheric origin), couplings of variable frequency electromagnetic pulses radiated from outside and possible saturations of electrostatic charges in the collecting devices.

For this and, concretely, the device essentially comprises two connection conductive adapters, charged of the connections of the device with the external collectors of the element to be protected, on the one hand, and with the earth connection, on the other hand; two elements of high reactance to the passage of the high frequency current and energy absorbers in the form of heat, one charged to generate a force against electromotive to the passage of the initial high frequency current, lowering the frequency and absorbing a part of the energy generated in heat, arriving eventually to the other element, after the current passed by a central system formed by a dielectric insulator located between both conductive elements and that basically forms the frequency resonator, this other high reactance element absorbing the residual energy and that only let pass the low frequency current.

In addition, in the preferred embodiment, it also comprises two supports of insulating material, to fix the elements inside a box, and that, in turn, avoid that the central system of the dielectric insulator touches the walls of the box, a very important concept, as electrical arcs can be formed between the conductive elements of the system in its process of normal compensation and operation.

On its part, the central system composed by the dielectric insulator and the two conductive elements arranged on both sides thereof, form the proper resonator and electromagnetic compensator.

As for as the box, preferably, it is a box of waterproof and airtight insulating material, with mechanical and antifire protection, essential in order that the electric charges only come in through the connection conductive adapters, that are externally located on both opposite sides of the box, and there exist no intake of electrified air or water, that could vary the operating conditions of the resonator or provoke a loss of insulation thereof and stands the heat conditions that are internally generated, that will have to stand minimum up to 200° C.

The device comprises, in addition, incorporated to the box, a series of pressure aeration valves from inside to outside and airtight to the entrance of humidity and air, charged to remove the internal overpressure of the box, so that there is always the same pressure inside and outside the box, as well as to remove the humidity from inside the box that can be present and avoid that the humidity comes in the box.

Preferably, the box comprises four pressure aeration valves, although such number can vary and will depend on the speed and quantity of air it is sought to be removed, in order that there does not exist, within the box, an overpressure in excess that could break it. The normal would be that there is a minimum of two valves and a maximum of four valves.

Last, it shall be mentioned that the disclosed elements of the device could have several geometrical shapes, that will depend on the protecting requirements and design for the structures to which they are designed.

Anyway the single premise is that, in order that the variable radio frequency electromagnetic compensating device operates correctly it has to be borne in mind that the conductive elements that are located on both sides of the dielectric insulator must have a concrete separation, depending on the conductivity of the material used and the degree of insulation of the dielectric element.

DESCRIPTION OF THE DRAWINGS

To complement the description that is being carried out and in order to assist to a best understanding of the characteristics of the invention, attached to this specification, as an integral part thereof, is a drawing in which for illustration and no limitation purpose, the following has been represented:

The FIGURE number 1 and unique. —It shows a schematic view in lateral perspective of an example of embodiment of the variable compensating device object of the invention, in which appear the main parts and elements it comprises, as well as its configuration and arrangement.

PREFERRED EMBODIMENT OF THE INVENTION

At the sight of the disclosed FIG. 1, and according to the numerals adopted in it, a not limiting example of embodiment of the variable radio frequency electromagnetic compensating device of the invention can be seen, which comprises what is described in detail below.

Thus, as it can be seen in the FIGURE, the device of the invention, applicable as system protecting against direct atmospheric discharges in the wind tower blades or other mobile or static structures and in mobile and static elements for collecting electric charges in general and protecting electromagnetic pulses that could affect them coming from atmospheric discharges between clouds, either positive or negative, in its close environment and against those coming from the emissions from towers or radiant antennas, from telecommunications, radars of any type or from another origin, comprises, at least, the following essential elements:

two conductive adapters of connection (1, 2), a first adapter (1) charged of the connections of the device with the external collectors of the element to be protected on the one hand and a second adapter (2) charged of the connections with the earth, on the other hand;

two elements of high reactance to the passage of high frequency current and absorbers of energy in form of heat (3, 4) that, connected on both sides of a frequency resonator (7, 8, 9) and respectively to the two adapters (1, 2), are charged, in a first element (3) connected to the first adapter (1), to generate a force against electromotive to the passage of high frequency initial current, lowering the frequency and absorbing a part of the energy generated in heat, and a second element (4) connected to the second adapter (2) and, after the current has passed by the frequency resonator (7, 8, 9), of absorbing the residual energy leaving that only the low frequency current passes; and a frequency resonator that constitutes the proper electromagnetic compensating device, being composed of a dielectric insulator (9) located between a first and a second conductive elements (7, 8) that in turn, respectively connect with the first and second high reactance elements to the passage high frequency current and of absorbing devices of energy in form of heat (3, 4).

In addition, preferably, the elements (1, 2, 3, 4, 7, 8, 9) are incorporated to an airtight box (10), so that all of them remain housed and insulated within it except the adapters (1, 2) that remain externally located on both sides thereof.

Inside the box (10) has been provided the existence of both supports (5) of insulating material, to fix the internal elements thereof and prevent that the frequency resonator (7, 8, 9) touches the walls of the box (10) and electric arcs can be formed during its operation.

Preferably, the box (10) is of insulating waterproof and airtight material, with mechanical and antifire protection, capable to stand temperatures of up to 200° C.

In addition, preferably the box (10) incorporates pressure aeration valves (6) from inside to outside and airtight to the entrance of humidity and air, charged to remove the internal overpressure of the box, so that there is always the same pressure inside and outside the box, as well as to remove the humidity from inside the box that can be present and avoid that the humidity comes in the box.

Preferably, the box possesses four pressure aeration valves (6) and, minimum it has two valves (6).

The nature of this invention being sufficiently disclosed, as well as the manner of implementing it, it is not considered necessary to extend any longer its explanation for any skilled man in the art understanding its extent and the advantages arising from it.

The invention claimed is:

1. A variable radio frequency electromagnetic compensating device for protecting wind tower blades or other mobile or static structures from direct atmospheric electromagnetic discharges and electromagnetic discharges coming from telecommunication towers or other radiant antenna emissions including radars, the device comprises, at least:

two conductive adapters, a first conductive adapter configured to connect to an external device be protected, and a second conductive adapter configured to connect to a ground connection; and two high reactance elements in form of heat energy absorbers connected on both sides of a frequency resonators and the two conductive adapters respectively;

wherein the high reactance elements include a first element connected to the first adapter to generate a force against electromotive to pass a high frequency initial current, and slower the frequency and absorb a part of heat generated energy, a second element connected to the second adapter, after the high frequency initial current has passed through the resonators, to absorb a residual energy that has only a low frequency current; and wherein the frequency resonators that constitute the proper electromagnetic compensating device, comprises a dielectric insulator located between a first and a second conductive element connect, respectively, with the first and second elements of the high reactance elements.

2. The variable radio frequency electromagnetic compensating device according to the claim 1, further comprises an airtight box, wherein the two high reactance elements, and the frequency resonators are housed and insulated in the box, the adapters that remain externally located on both sides of the box.

3. The variable radio frequency electromagnetic compensating device according to the claim 2, wherein the box includes first and second insulated material supports that prevent the frequency resonator contacting walls of the box thereby preventing electric arcs that can be formed during device operation.

4. The variable radio frequency electromagnetic compensating device according to claim 2, wherein the box is comprised of a waterproof and airtight insulating material, with mechanical and antifire protection, capable to stand up to 200° ° C.

5. The variable radio frequency electromagnetic compensating device according to claim 2, wherein the box incorporates pressure aeration valves from inside to outside and is airtight to entrance of humidity and air, and to remove the internal overpressure of the box, so that the box always maintains the same pressure, as well as to remove the humidity from inside the box that can be present and avoid that the humidity comes in the box.

6. The variable radio frequency electromagnetic compensating device according to the claim 5, wherein the box further comprises at least two aeration pressure valves.

7. The variable radio frequency electromagnetic compensating device according to the claim 6, wherein the box includes four valves.

8. The variable radio frequency electromagnetic compensating device according to claim 3, wherein the box is comprised of a waterproof and airtight insulating material, with mechanical and antifire protection, capable to stand up to 200° C.

9. The variable radio frequency electromagnetic compensating device according to claim 3, wherein the box incorporates pressure aeration valves from inside to outside and airtight to the entrance of humidity and air, charged to remove the internal overpressure of the box, so that there is always the same pressure inside and outside the box, as well as to remove the humidity from inside the box that can be present and avoid that the humidity comes in the box.

10. The variable radio frequency electromagnetic compensating device according to claim 4, wherein the box incorporates pressure aeration valves from inside to outside and airtight to the entrance of humidity and air, to remove the internal overpressure of the box, so that there is always the same pressure inside and outside the box, as well as to remove the humidity from inside the box that can be present and avoid that the humidity comes in the box.

\* \* \* \* \*